United States Patent
Wakita et al.

(10) Patent No.: US 7,871,956 B2
(45) Date of Patent: Jan. 18, 2011

(54) CERIUM/ZIRCONIUM-BASE COMPOSITE OXIDE, METHOD FOR PRODUCING THE SAME, OXYGEN STORAGE/RELEASE COMPONENT USING SAID CERIUM-ZIRCONIUM-BASE COMPOSITE OXIDE, EXHAUST GAS PURIFICATION CATALYST, AND EXHAUST GAS PURIFICATION METHOD USING THE SAME

(75) Inventors: Takahiro Wakita, Osaka (JP); Akira Kohara, Osaka (JP); Yasuharu Kanno, Numazu (JP); Hiroaki Omoto, Numazu (JP)

(73) Assignees: Daiichi Kigenso Kagaku Kogyo Co., Ltd., Osaka-shi (JP); N.E. Chemcat Corporation, Tokyo (JP)

( * ) Notice: Subject to any disclaimer, the term of this patent is extended or adjusted under 35 U.S.C. 154(b) by 104 days.

(21) Appl. No.: 11/717,162

(22) Filed: Mar. 13, 2007

(65) Prior Publication Data
US 2007/0155624 A1 Jul. 5, 2007

Related U.S. Application Data

(63) Continuation-in-part of application No. PCT/JP2005/016809, filed on Sep. 13, 2005.

(30) Foreign Application Priority Data

Sep. 16, 2004 (JP) ............................. 2004-303557

(51) Int. Cl.
- B01J 21/06 (2006.01)
- B01J 23/10 (2006.01)
- C01G 25/02 (2006.01)
- C01B 13/14 (2006.01)
- C01F 17/00 (2006.01)

(52) U.S. Cl. ........................ 502/304; 502/302; 502/349; 502/439; 423/593.1; 423/594.12; 423/608

(58) Field of Classification Search ................. 502/302, 502/304, 349, 439; 423/593.1, 594.12, 608
See application file for complete search history.

(56) References Cited

U.S. PATENT DOCUMENTS 4,590,090 A * 5/1986 Siemers et al. .............. 427/453

(Continued)

FOREIGN PATENT DOCUMENTS

JP 6-75675 9/1994

(Continued)

OTHER PUBLICATIONS

Toshiyuki Masui et al., "Preparation of ceria-zirconia sub-catalysts for automotive exhaust cleaning," Journal of Alloys and Compounds 303-304, 2000, pp. 49-55.

(Continued)

*Primary Examiner*—Timothy C Vanoy
*Assistant Examiner*—Diana J Liao
(74) *Attorney, Agent, or Firm*—Edwards Angell Palmer & Dodge LLP

(57) ABSTRACT

This invention relates to a cerium-zirconium-base composite oxide, which is useful, e.g., for the purification of exhaust gas discharged from combustion engines such as internal combustion engines and boilers and can release a high level of oxygen in a low temperature region, a method for producing the same, an oxygen storage/release component using the same, an exhaust gas purification catalyst, and an exhaust gas purification method. The cerium-zirconium-base composite oxide satisfies requirements (1) that the oxygen release initiation temperature is 380° C. or below, (2) that the oxygen release amount is not less than 485 μmol/g, and further (3) that the oxygen release amount at 400° C. is not less than 15 μmol/g. The cerium-zirconium-base composite oxide can be produced, for example, by mixing a starting material for cerium and a starting material for zirconium at a predetermined mixing ratio together, melting the starting material mixture at a temperature at or above the melting point, then cooling the melt to form an ingot, then optionally grinding the ingot to prepare powder, subsequently removing strain within powder crystal grains under heating, and then grinding to a further fine state.

8 Claims, 5 Drawing Sheets

U.S. PATENT DOCUMENTS 5,945,369 A * 8/1999 Kimura et al. .............. 502/304
6,620,392 B2 * 9/2003 Okamoto et al. ......... 423/213.5
6,831,036 B1 12/2004 Yamazaki et al.

FOREIGN PATENT DOCUMENTS

| | | |
|---|---|---|
| JP | 2000-281343 | 10/2000 |
| JP | 2001-89143 | 4/2001 |
| JP | 2001-310131 | 11/2001 |
| JP | 2004-529837 | 9/2004 |
| WO | 03/053852 A1 | 7/2003 |

PUBLICATIONS

Supplementary European Search Report dated Aug. 5, 2010, issued in the corresponding European Patent Application No. 05783663.7.

* cited by examiner

[Fig. 1]
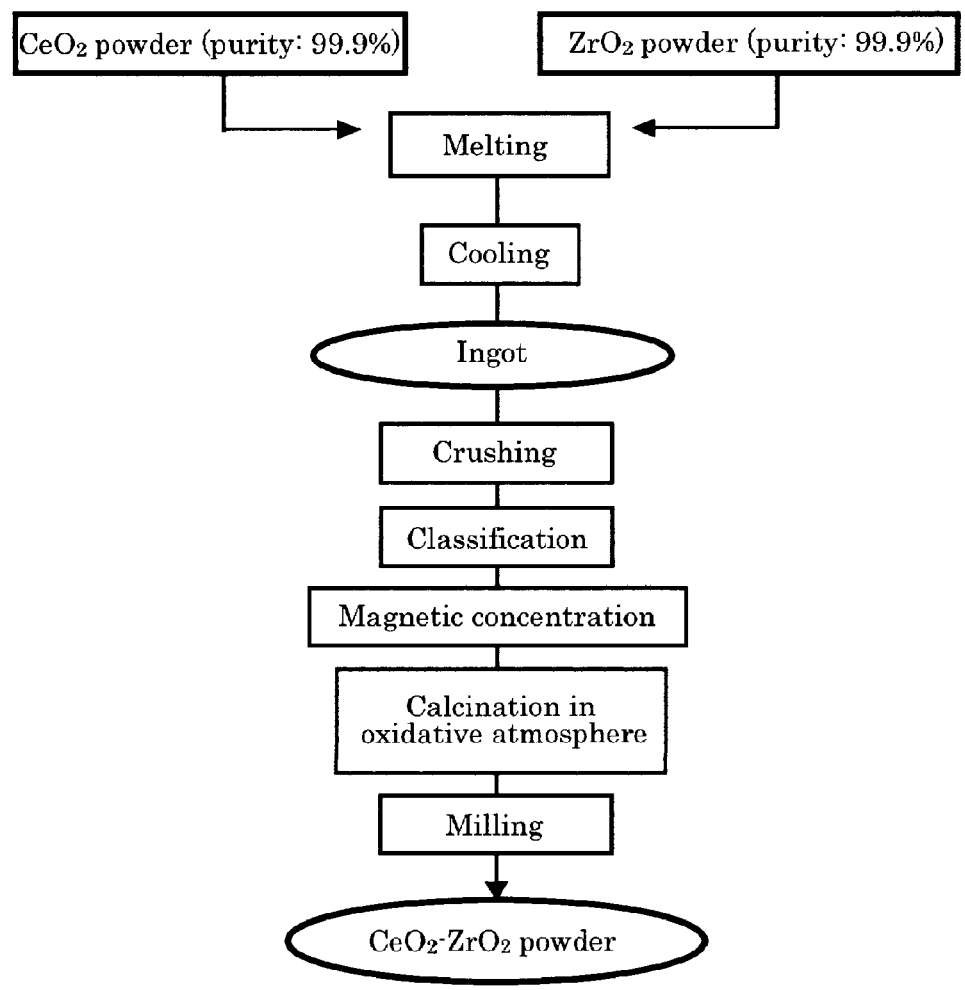

[Fig. 2]
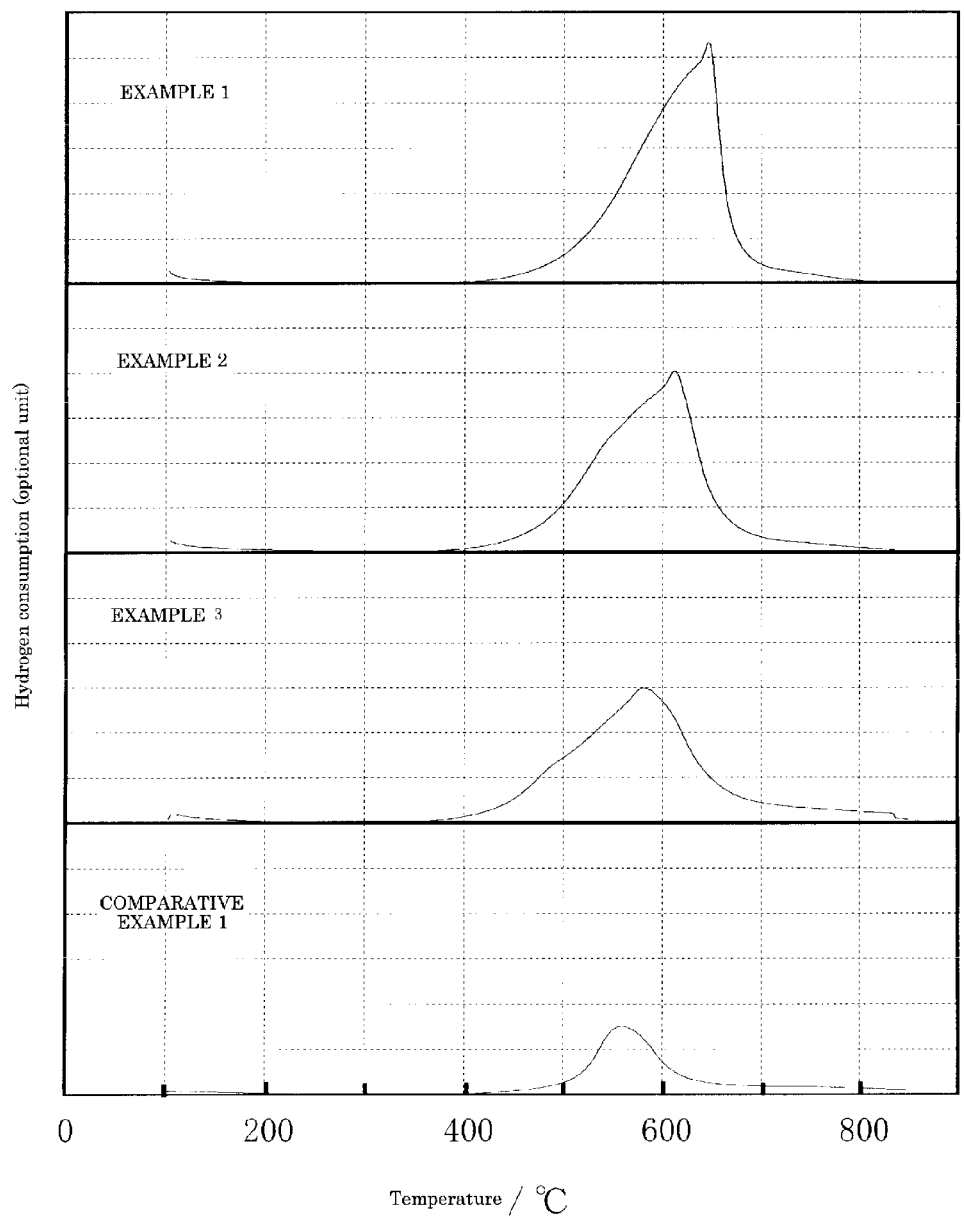

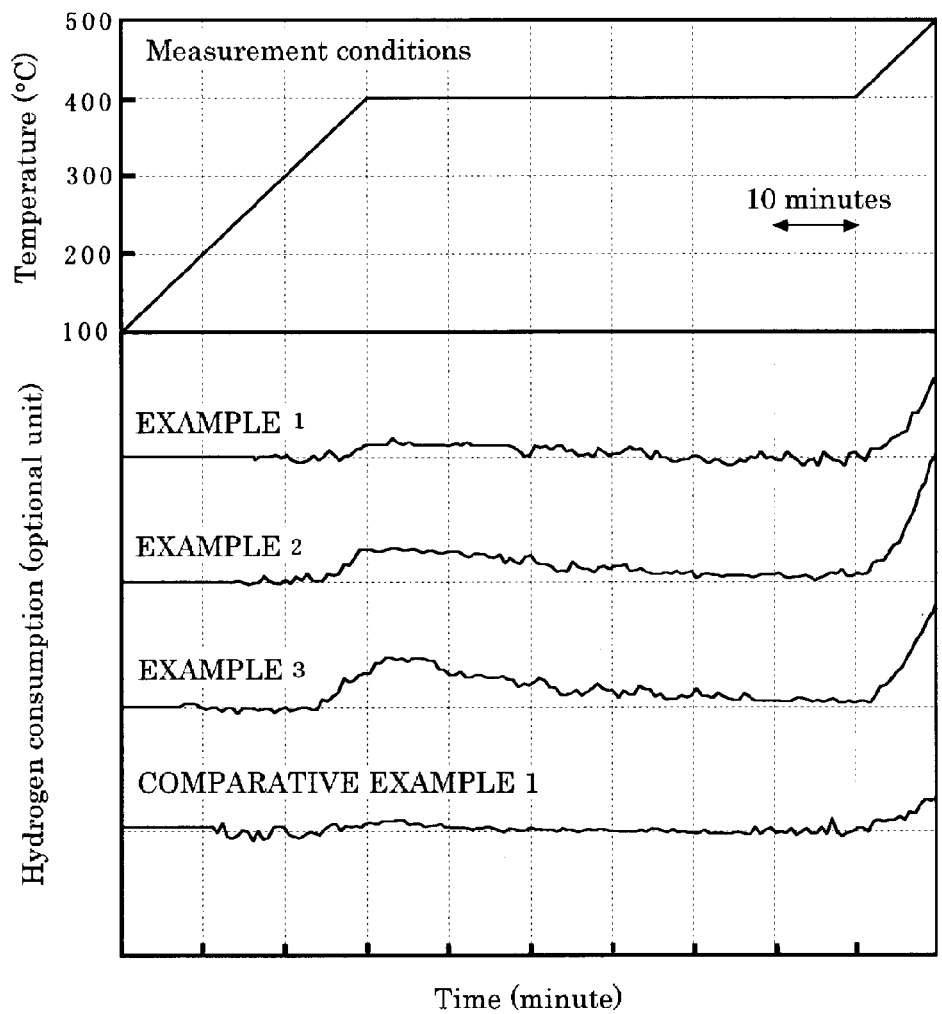

[Fig. 4]
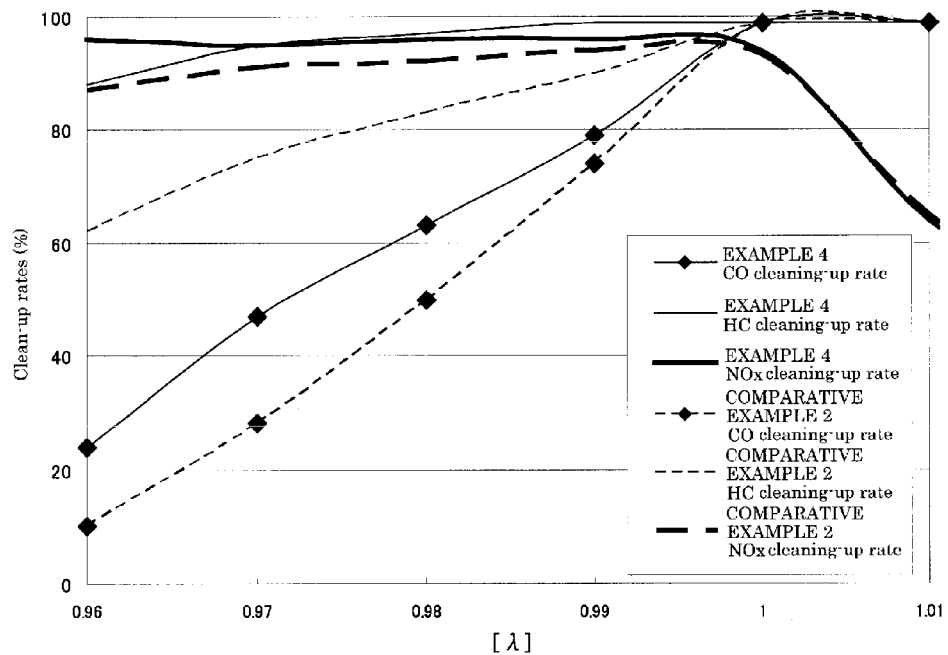
[Fig. 5]
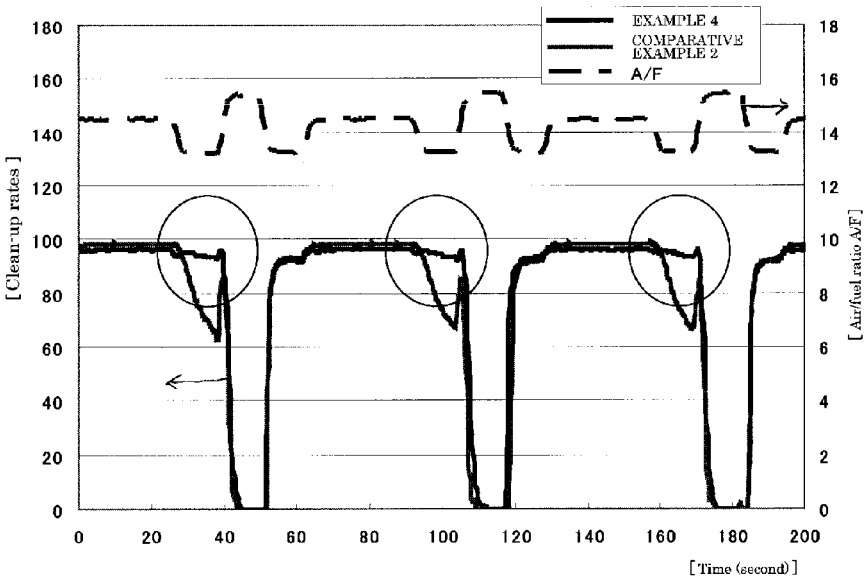

[Fig. 6(A)]
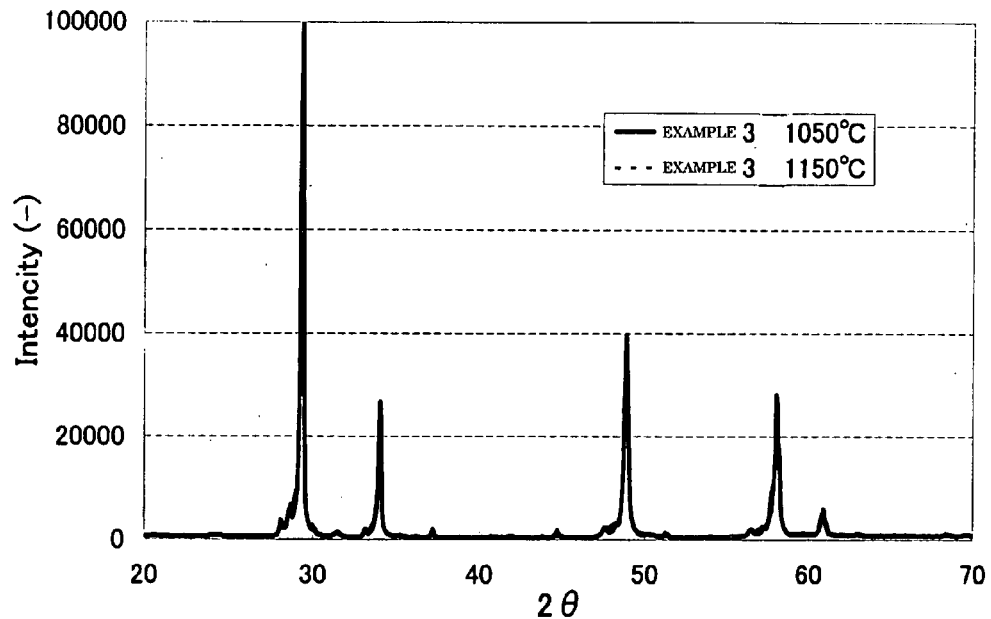
[Fig. 6(B)]
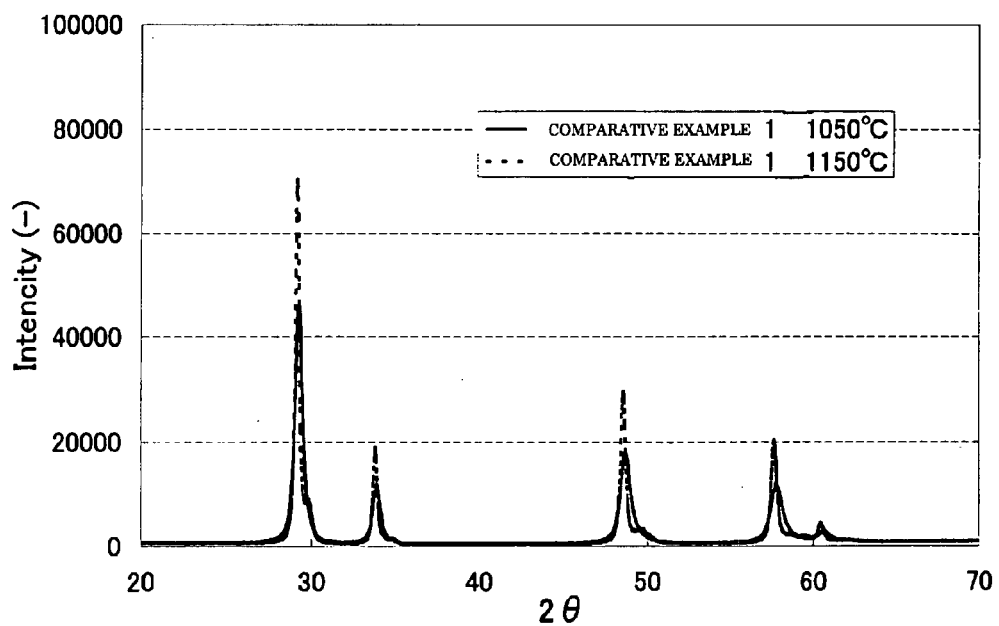

CERIUM/ZIRCONIUM-BASE COMPOSITE OXIDE, METHOD FOR PRODUCING THE SAME, OXYGEN STORAGE/RELEASE COMPONENT USING SAID CERIUM-ZIRCONIUM-BASE COMPOSITE OXIDE, EXHAUST GAS PURIFICATION CATALYST, AND EXHAUST GAS PURIFICATION METHOD USING THE SAME

This application is a continuation-in-part of international application PCT/JP05/016809 filed Sep. 13, 2005.

BACKGROUND OF THE INVENTION

1. Field of the Invention

The present invention relates to a cerium/zirconium-base composite oxide, method for producing the same, and oxygen storage/release component, exhaust gas purification catalyst and exhaust gas purification method using the same, more specifically a cerium/zirconium-base composite oxide (hereinafter sometimes referred to simply as "composite oxide") useful for, e.g., purification exhaust gases discharged from combustion devices, e.g., internal combustion engines and boilers, and capable of releasing a large amount of oxygen in a low temperature range, method for producing the same, and oxygen storage/release component, exhaust gas purification catalyst and exhaust gas purification method using the same.

2. Description of the Prior Art

Exhaust gases discharged from combustion devices, e.g., internal combustion engines for vehicles and boilers, contain hazardous substances, e.g., hydrocarbons (HC), carbon monoxide (CO) and nitrogen oxides (NOx), and exhaust gas purification techniques which can simultaneously purify these hazardous substances have been extensively studied. The catalyst used for these techniques is referred to as a three-way catalyst, and some have been already commercialized.

In particular, the three-way catalyst for vehicles is required to efficiently purify these hazardous substances of CO, HC and NOx while flexibly coping with rapidly changing concentrations of these substances, ranging from several ppm to several %.

Oxygen present in exhaust gases plays important roles in systems for catalytically purification these hazardous substances, e.g., promotion of CO and HC oxidation and NOx reduction. However it is difficult to keep constant engine combustion conditions, because of changing driving conditions resulting from changing traffic conditions, with the result that oxygen concentration changes every second. Therefore, a purification system which depends on oxygen will have a deteriorated efficiency for removing these hazardous substances, when its concentration drops. Therefore, the catalyst is incorporated with an oxygen storage/release component (hereinafter referred to as OSC), which releases oxygen into exhaust gases containing oxygen at an insufficient concentration, to improve hazardous substance purification capacity.

$CeO_2$ powder has been used for an OSC, because of its high oxygen storage/release capacity, and demonstrating improved exhaust gas purification efficiency. Extensive studies have been made on improvement of oxygen storage/release capacity and releasing characteristics of $CeO_2$-base powder, e.g., $CeO_2/ZrO_2$-base powder, and also on exhaust gas purification catalysts which are incorporated with $CeO_2$-base powder as a promoter.

It is discussed that a cerium/zirconium-base composite oxide of specific atomic composition is effective as an oxygen storage/release component for adjusting exhaust gas purification catalyst functions of oxidation of HC and CO and reduction of NOx (JP-B-6-75675). The document discusses that the composite oxide exhibits high durability to high temperature for exhaust gas oxidation catalysts, when it has a zirconium/cerium (Zr/Ce) atomic ratio in a range from 5/95 to 70/30.

However, conventional knowledge on OSCs is difficult to sufficiently cope with market requirements of improved exhaust gas purification capacity, because needs for catalysts of improved characteristics are ever increasing to satisfy governmental regulations, which are becoming more stringent to cope with environmental problems related to exhaust gases, which are becoming more serious.

An exhaust gas purification catalyst mounted in a vehicle is positioned under a floor, at which temperature is relatively low or directly below the engine where it is exposed to high temperature of exhaust gases immediately after being discharged from the engine. Exhaust gases, which are at high temperature immediately after being discharged from an engine, lose temperature when they reach the underfloor area. These conditions are not favorable for exhaust gas purification, because many exhaust gas purification catalysts generally exhibit a high activity at above a certain high temperature. Nevertheless, however, a catalyst positioned under a vehicle floor is required to exhibit purification capacity even under decreased temperature conditions.

On the other hand, the one positioned directly under an engine may have the exhaust gas purification catalyst components sintered when exposed to exhaust gases, which may be at above 1000° C. Therefore, the catalyst is required to have a stable exhaust gas purification capacity even under severe high-temperature conditions by suppressing sintering of the components. Under these situations, development of OSCs exhibiting excellent performance even under high temperature has been promoted. For example, JP-A-2001-89143 proposes a cerium/zirconium-base composite oxide that oxygen release initiation temperature is at 400° C. or below and that oxygen release amount is not less than 500 μmol/g as an oxygen molecule, even after being exposed to oxidation/reduction cycles at 1000° C.

JP-A 2004-529837 proposes a cerium/zirconium composite oxide having multi-phase cubic crystal habits. It is claimed to have a sufficient high oxygen storage/release capacity for vehicle catalysts, above 300 μmol/g after being exposed to 1000° C. for 4 hours, and high resistance to high temperature.

However, the markets are demanding OSCs capable of releasing oxygen in a low temperature range and having a higher oxygen storage/release capacity, and also demanding exhaust gas purification catalysts of longer service life and higher resistance to high temperature, as exhaust gas regulations are becoming more stringent.

Various types of catalysts have been applied to vehicle exhaust gas purification, to cope with required purification functions. One type of these catalysts simultaneously performs oxidation of CO and HC and reduction of NOx for purification exhaust gases. Such a catalyst is known as a three-way catalyst (hereinafter referred to as TWC). The TWCs generally have a structure with a noble metal, e.g., platinum, rhodium or palladium, loaded on a porous carrier of alumina as a base, which is further loaded on a structured carrier of cordierite or the like.

It is known that a TWC is incorporated with an OSC of cerium/zirconium composite oxide (JP-B-6-75675). However, TWCs of sufficient performance have not been commercialized.

SUMMARY OF THE INVENTION

The present invention has been developed to solve the problems described above. The purposes of the present invention are to provide a cerium/zirconium-base composite oxide useful for, e.g., purification exhaust gases discharged from combustion devices, e.g., internal combustion engines and boilers, and capable of releasing a large amount of oxygen in a low temperature range, method for producing the same, and oxygen storage/release component, exhaust gas purification catalyst and exhaust gas purification method using the same.

The inventors of the present invention have confirmed, after having extensively studied to solve the above problems, that a ceria/zirconia-base composite oxide having unexpectedly improved oxygen release initiation temperature, a high oxygen storage/release amount and capacity of releasing large amount of oxygen in a low temperature range, when a mixture of cerium and zirconium starting materials prepared under specific conditions is molten at high temperature, cooled, ground and, as required, calcined in an oxidative atmosphere, and have found that the ceria/zirconia-base composite oxide, when used as an OSC, provides a catalyst which can efficiently purify exhaust gases containing CO, HC and NOx, achieving the present invention.

The first aspect of the present invention is a cerium/zirconium-base composite oxide which contains cerium and zirconium, satisfies requirement (1) an oxygen release initiation temperature is 380° C. or below, (2) an oxygen release amount is not less than 485 μmol/g, and further (3) an oxygen release amount at 400° C. is not less than 15 μmol/g.

The second aspect of the present invention is the cerium/zirconium-base composite oxide of the first aspect, wherein the $CeO_2/(ZrO_2+CeO_2)$ molar ratio is 1/9 to 9/1.

The third aspect of the present invention is the cerium/zirconium-base composite oxide of the second aspect, wherein the $CeO_2/(ZrO_2+CeO_2)$ molar ratio is 2/3 to 3/2.

The fourth aspect of the present invention is the cerium/zirconium-base composite oxide of the first aspect wherein an average particle diameter is 0.3 to 2.0 μm.

The fifth aspect of the present invention is a method for producing the cerium/zirconium-base composite oxide of one of the first to fourth aspects, comprising a step for mixing a starting material for cerium and a starting material for zirconium at a predetermined mixing ratio together; a step for melting the starting material mixture at a temperature at or above the melting point; a step for cooling the melt to form into an ingot; a step for grinding the ingot to prepare powder; then optionally removing strain within powder crystal grain under heating; and a step for grinding to further fine state.

The sixth aspect of the present invention is the method of the fifth aspect for producing the cerium/zirconium-base composite oxide, wherein the starting material mixture is heated by an arc type electric furnace.

The seventh aspect of the present invention is the method of the fifth aspect for producing the cerium/zirconium-base composite oxide, wherein the starting material mixture is heated for 0.5 to 3 hours.

The eighth aspect of the present invention is the method of the fifth aspect for producing the cerium/zirconium-base composite oxide, wherein the powder has an average particle diameter of 3 mm or less.

On the other hand, the ninth aspect of the present invention is an oxygen storage/release component containing the cerium/zirconium-base composite oxide of one of the first to fourth aspects.

The tenth aspect of the present invention is an exhaust gas purification catalyst containing the oxygen storage/release component of the ninth aspect.

The 11th aspect of the present invention is the exhaust gas purification catalyst of the tenth aspect, wherein the oxygen storage/release component has a particle diameter of 1 mm or less.

The 12th aspect of the present invention is the exhaust gas purification catalyst of the tenth aspect, wherein the exhaust gas purification catalyst further contains at least one species of noble metal element selected from the group consisting of platinum, rhodium and palladium.

The 13th aspect of the present invention is the exhaust gas purification catalyst of the 12th aspect, wherein the noble metal element is loaded on a porous inorganic oxide.

Moreover, the 14th aspect of the present invention is the exhaust gas purification catalyst of the tenth aspect, wherein the oxygen storage/release component is coated or is formed into pellet, on a surface of internal structure type carrier.

On the other hand, the 15th aspect of the present invention is an exhaust gas purification method, wherein the exhaust gas purification catalyst of one of the 10th to 14th aspects is positioned in an exhaust gas passage to allow the exhaust gases to pass over the catalyst to purify at least one species of hazardous substance of carbon monoxide, hydrocarbons or nitrogen oxides present in the exhaust gases.

The 16th aspect of the present invention is the exhaust gas purification method of the 15th aspect, wherein the exhaust gas passage is for an internal combustion engine.

The 17th aspect of the present invention is the exhaust gas purification method of the 15th aspect, wherein the internal combustion engine is operated under rich and lean conditions cyclically.

The present invention can provide a ceria/zirconia-base composite oxide having improved oxygen release initiation temperature, a high oxygen storage/release amount and high capacity of releasing large amount of oxygen in a low temperature range.

The ceria/zirconia-base composite oxide of the present invention is produced by a special method comprising a step for mixing cerium and zirconium in an optimum ratio, and a step for calcining the mixture after it is molten, which represents an unprecedented procedure for producing OSCs. The composite oxide thus produced exhibits, when used for an exhaust gas purification catalyst, excellent effects for purification hazardous substances present in the exhaust gases.

Moreover, the composite oxide of the present invention naturally exhibits excellent effects for purification hazardous substances present in exhaust gases, when used for a TWC, in particular a characteristic effect of NOx purification even at a low oxygen concentration in exhaust gases, resulting from a vehicle engine operating under a rich condition.

BRIEF DESCRIPTION OF THE DRAWINGS

FIG. 1 illustrates a method (procedure) flow diagram for producing the cerium/zirconium composite oxide of the present invention;

FIG. 2 illustrates oxygen-release amount of the cerium/zirconium composite oxides synthesized in EXAMPLES 1 to 3 and COMPARATIVE EXAMPLE 1;

FIG. 3 illustrates oxygen-release amount at 400° C. of the cerium/zirconium composite oxides synthesized in EXAMPLES 1 to 3 and COMPARATIVE EXAMPLE 1;

FIG. 4 illustrates effects of air/fuel ratio (λ) on purification rates of CO, HC and NOx present in exhaust gases with catalysts of integral structure;

FIG. 5 illustrates NOx purification rate under conditions of cyclically changed air/fuel (A/F) ratio, with catalysts of integral structure;

FIG. 6 shows X-ray diffraction (XRD) patterns comparing the cerium/zirconium composite oxide structures of the present invention (A) with a conventional cerium/zirconium composite oxide structure (B), before and after a durability test carried out under heating.

DETAILED DESCRIPTION OF THE INVENTION

Next, the cerium/zirconium-base composite oxide, method for producing the same, and oxygen storage/release component, exhaust gas purification catalyst and exhaust gas purification method using the same, all of the present invention, are described in detail by referring to the drawings.

1. Composite Oxide Containing Cerium and Zirconium

The cerium/zirconium-base composite oxide of the present invention is characterized by having (1) an oxygen release initiation temperature of 380° C. or below, (2) an oxygen release amount of 485 µmol/g or more, and (3) an oxygen release amount at 400° C. of 15 µmol/g or more.

It has (1) an oxygen release initiation temperature of 380° C. or below (preferably 375° C. or below), by which is meant that it starts to work at a lower temperature, (2) a high oxygen release amount of 485 µmol/g or more (preferably 500 µmol/g or more), and (3) an oxygen release amount of 15 µmol/g or more (preferably 50 µmol/g or more) at 400° C., representing a high oxygen release capacity at low temperature.

The cerium and zirconium contents are not limited for the present invention. However, the $CeO_2/(ZrO_2+CeO_2)$ molar ratio is preferably 1/9 to 9/1, more preferably 2/3 to 3/2 because of formation of a pyrochlore oxide.

The cerium/zirconium-base composite oxide of the present invention was subjected to a durability test carried out under heating, to follow the structural changes before and after the test by an X-ray diffractometer (XRD). FIG. 6 (A) shows the XRD patterns of the sample. The sample calcined at high 1050° C. and 1150° C. in air had the main peak (relevant to $Zr_{0.5}Ce_{0.5}O_2$) essentially overlapping each other, from which it is apparent that the composite oxide is sufficiently stable to heat and has a large crystalline structure, judging from sharpness of the peak.

FIG. 6 (B) shows the XRD patterns of a conventional compound disclosed by JP-B-6-75675 or the like, representing the structural changes before and after the durability test carried out under heating. The sample durability-tested at the same temperature levels had the main peak (relevant to $Zr_{0.45}Ce_{0.65}O_2$) becoming sharper gradually, indicating that it underwent physical condition changes more notably. It is apparent, therefore, that it is clearly less stable to heat than the cerium/zirconium-base composite oxide of the present invention.

2. Method for Producing the Cerium/Zirconium-base Composite Oxide

The method of the present invention for producing the cerium/zirconium-base composite oxide is characterized by comprising a step for mixing a starting material for cerium and a staring material for zirconium at a predetermined mixing ratio together (sometimes referred to as starting cerium and zirconium materials, respectively); a step for melting the starting material mixture at a temperature at or above the melting point; a step for cooling the melt to form into an ingot; a step for grinding the ingot to prepare powder; then optionally removing strain within powder crystal grain under heating; and a step for grinding to further fine state.

One embodiment of the method of the present invention for producing the cerium/zirconium-base composite oxide is described by referring to FIG. 1, which, however, by no means limits the present invention.

The starting cerium material for the present invention is not limited. However, it is preferably cerium oxide. The cerium oxide may be produced from the nitrate, carbonate, sulfate, acetate, chloride, bromide or the like. The starting zirconium material for the present invention is also not limited. However, it is preferably a zirconium element material containing zirconium oxide, e.g., baddeleyite, desiliconized zirconia or zirconium oxide. The zirconium oxide may be produced from the nitrate, carbonate, sulfate, acetate, chloride, bromide or the like. The starting cerium and zirconium materials may be in the form of mixture or composite oxide containing these elements. Purity of the starting cerium and zirconium materials is not limited, but preferably 99.9% or more, as illustrated in FIG. 1.

As discussed above, each of the starting cerium and zirconium materials is preferably in the form of oxide. It may be incorporated with small quantities of a nitrate, carbonate, sulfate, acetate, chloride or bromide of cerium or zirconium. The starting compound other than oxide may accelerate melting of the mixture in the composite oxide producing method, described later.

The elementary materials for the present invention are not limited, so long at least one of them can be molten, when heated in the process for producing the composite oxide, described below. It is known that cerium oxide and zirconium oxide melt at high 2200° C. and 2720° C., respectively. However, they may be molten at below an oxide melting point when present in the mixture, because of the melting point depression effect. A third component, e.g., flux, may be incorporated in trace quantities to depress melting point. Melting point of the starting mixture varies depending on ceria/zirconia molar ratio. More specifically, it is about 2600° C. in a $CeO_2/ZrO_2$ molar ratio of 1/9, about 2200° C. at 5/5 and about 2000° C. at 9/1.

When a third component other than cerium or zirconium material, it may be an alkali metal, alkali-earth metal or another metallic component within limits not harmful to characteristics of the OSC of the present invention. More specifically, it may be potassium, rubidium, cesium, magnesium, calcium, strontium, barium, antimony, hafnium, tantalum, rhenium, bismuth, praseodymium, neodymium, samarium, gadolinium, holmium, thulium, ytterbium, germanium, selenium, cadmium, indium, scandium, titanium, niobium, chromium, iron, silver, rhodium, platinum or the like. Such a third component may be present as an impurity originally present in the elementary cerium or zirconium material. It is preferable, needless to say, that such a third component is diminished or removed, when it is regulated as a hazardous material.

The starting cerium and zirconium materials are put in a melting apparatus, after being mixed with each other in a given ratio. The mixture composition is preferably in a range from 5/95 to 70/30 as Zr/Ce atomic ratio in the composite oxide. The OSC may not have a sufficient oxygen storage/release capacity and heat resistance, when the composition is beyond the above range.

The method for melting the starting material mixture is not limited, so long as it can melt at least one of the starting materials. It may be molten by an arc or r.f. thermoplasma furnace, or the like, of which an arc furnace as a common electrofused method is more preferable.

The starting cerium and zirconium starting mixture, when to be molten in an arc furnace, may be added, as required, with a specified amount of coke as an electroconductive material to facilitate electricity distribution during the initial stage, depending on composition of the starting mixture. Subsequently, it is heated to 2400° C. or higher at, for example, a secondary voltage and average load power of 70 to 100 V and 80 to 100 kW, respectively. It can be uniformly molten, when held at the above temperature for 0.5 to 3 hours, after it is molten. The temperature may be 2000° C. or higher, preferably melting point of at least one of the starting materials or higher, particularly preferably 2600 to 2800° C. It is preferably held for 1 to 2 hours while being kept molten. The melting atmosphere is not limited. It may be molten in air or an inert gas atmosphere, e.g., nitrogen, argon or helium. The melting pressure is not limited. It may be molten under normal or pressure, or reduced pressure. The melting can be carried out generally at the atmospheric pressure.

On completion of the melting, the molten mixture is slowly cooled for 20 to 30 hours in the electric furnace sealed with a carbon lid, to produce the ingot. The method for cooling the molten substance is not limited. However, it is normally cooled slowly in air to 100° C. or below, preferably 50° C. or below, after being withdrawn from the melting apparatus. This produces the ingot of cerium/zirconium-base composite oxide of uniform composition.

The ingot prepared by melting the starting mixture is then ground. The method for grinding the ingot is not limited, and it may be ground by an adequate machine, e.g., jaw crusher, roll crusher or the like. It is preferably ground and classified to have a diameter of 3 mm or less, more preferably 1 mm or less to facilitate handling of the resulting powder in the subsequent steps.

The resulting powder is treated by magnetic separation to remove impurities. Suboxides formed during the melting step and strains in the crystal formed as a result of supercooling can be removed by annealing in an oxidative atmosphere in an electric furnace or the like. The annealing conditions are not limited, so long they can oxidize the ingot or the powder. It is carried out normally at 100 to 1000° C., preferably 600 to 800° C. Annealing time is not limited, but may be 1 to 5 hours, preferably 1 to 3 hours.

The powder may be further ground finely, depending on its purposes. The method for fine grinding is not limited. It may be ground by an adequate machine, e.g., planetary mill, ball mill, jet mill or the like for 5 to 30 minutes. It is preferably ground to an extent of 0.3 to 2.0 µm, more preferably 0.5 to 1.5 µm as average particle diameter of the cerium/zirconium-base composite oxide. Finely ground composite oxide can have a larger surface area, so the cerium/zirconium-base composite oxide can have a larger release oxygen amount in a low temperature range, although the mechanisms involved are not fully substantiated. The average particle diameter can be determined by an adequate analyzer, e.g., laser diffraction/scattering analyzer.

As described above, the method of the present invention produces the composite oxide in the form of solid solution by melting a mixture of cerium and zirconium oxides. It is clearly different from conventional OSC producing methods, e.g., that disclosed by JP-B-6-75675, in which a mixture of cerium and zirconium salts is calcined at 1000° C. or below, or 1300° C. at the highest.

Oxygen release initiation temperature and oxygen release amount associated with the cerium/zirconium-base composite oxide produced by the method of the present invention can be determined by Temperature-Programmed Reduction (TPR) with hydrogen, using an analyzer, e.g., (MULTITASK TPR, BEL JAPAN INC.). Amount of oxygen released at 400° C. can be also determined similarly.

The cerium/zirconium-base composite oxide of the present invention and a conventional cerium/zirconium-base composite oxide were subjected to a durability test carried out under heating, to follow the structural changes before and after the test by an X-ray diffractometer (XRD). FIG. 6 (A) and (B) show the XRD patterns of the samples.

As discussed above, the cerium/zirconium-base composite oxide of the present invention (A), calcined at high 1050° and 1150° C. in air has the main peak (relevant to $Zr_{0.5}Ce_{0.5}O_2$) essentially overlapping each other, from which it is confirmed that it is sufficiently stable to heat and has a large crystalline structure, judging from sharpness of the peak. By contrast, the conventional composite oxide (B), calcined under the same conditions, has the main peak (relevant to $Zr_{0.45}Ce_{0.65}O_2$) becoming sharper gradually, indicating that it undergoes physical condition changes more notably. It is apparent, therefore, that it is clearly less stable to heat than the cerium/zirconium-base composite oxide of the present invention.

3. Oxygen Storage/Release Component and Exhaust Gas Purification Catalyst

The present invention also provides an oxygen storage/release component containing the above-described cerium/zirconium-base composite oxide, and an exhaust gas purification catalyst, which contains the oxygen storage/release component and exhibits excellent effects of purification hazardous substances of HC, CO and NOx present in exhaust gases.

The composite oxide composition for the oxygen storage/release component and exhaust gas purification catalyst, both of the present invention, preferably has a zirconium/cerium atomic ratio in a range from 5/95 to 70/30. At an atomic ratio below 5/95, i.e., cerium-rich composition, the composite oxide grains tend to grow excessively, when exposed to high-temperature exhaust gasses. At an atomic ratio above 70/30, i.e., zirconium-rich composition, the composite oxide contains cerium at an insufficient content to have an insufficient oxygen storage/release capacity and deteriorated purification performance.

A catalytically active species, e.g., a noble metal, is not essential for the exhaust gas purification catalyst of the present invention, depending on its types or purposes. However, the catalyst is preferably incorporated with the cerium/zirconium-base composite oxide in combination with a catalytically active metal. The catalytically active metal may be used individually. However, it is preferably supported by a porous inorganic oxide as a base for improved stability to heat and atmospheres and improved activity. The cerium/zirconium-base composite oxide combined with a catalytically active metal, porous inorganic oxide and the like may be hereinafter referred to as a catalyst composition.

The metallic catalyst component useful for the present invention is not limited, so long as it has an exhaust gas purification activity. It may be selected from transition metals, rare-earth metals and noble metals.

Some of the metals useful for the present invention include transition metals, e.g., iron, nickel, cobalt, zirconium and copper; rare-earth metals, e.g., cerium, lanthanum, praseodymium and neodymium; and noble metals, e.g., gold, silver, platinum, palladium and rhodium. At least one of these may be adequately selected for the present invention. The particularly preferable metallic catalyst component is at least one species selected from platinum, rhodium and palladium.

The composite oxide of the present invention, when used for a TWC, preferably contains rhodium as an essential noble metal which is combined with at least one of platinum and palladium for improved NOx purification performance.

The starting metallic catalyst component for the exhaust gas purification catalyst of the present invention is in the form of nitrate, sulfate, carbonate, acetate or the like. It is normally dissolved in water or an organic solvent for production of the catalyst. It is mixed with a base (carrier), on which it is supported, and the cerium/zirconium-base composite oxide of the present invention, and the resulting mixture is dried at, e.g., 50 to 200° C. to remove the solvent, and then calcined at 300 to 1200° C. to produce the catalyst composition.

The base on which the catalyst component is supported is preferably of a porous inorganic material having a high specific surface area, selected from activated alumina (e.g., γ- or θ-alumina), zirconia, titanium oxide, silica and various types of zeolite. The base may be incorporated with a rare-earth element, e.g., lanthanum, cerium, barium, praseodymium or strontium, or an alkali-earth metal for improved heat resistance.

The methods for loading a catalytically active metal on a porous inorganic base include, in addition to calcining a mixture of a porous inorganic base and metallic salt solution described above, calcining a mixture of the composite oxide of the present invention and another component with an aqueous medium, after the mixture is coated on a carrier of integral structure, described later, and calcining the mixture free of a metallic salt after it is coated on a carrier of integral structure and impregnating the coated carrier with a metallic salt solution. The catalytic component may be incorporated with a dispersant, pH adjuster or the like while it is mixed into a solution.

Quantity of the metallic catalyst component varies depending on types of active metal, inorganic base and carrier, catalyst purposes and so forth. When the metallic catalytic component is a noble metal to be coated on a carrier of integral structure, it is incorporated preferably at 0.01 to 20 g/L of the carrier of integral structure, particularly preferably 0.1 to 15 g/L. At above 20 g/L, the catalyst production cost may be excessive for the performance. At below 0.01 g/L, on the other hand, the catalyst may not fully exhibit the exhaust gas purification performance.

When the catalyst of the present invention is used for a TWC, it is preferably incorporated with rhodium as a noble metal component. In this case, it is incorporated at 5 to 50% by mass on total noble metals, preferably 10 to 30% by mass, the balance being at least one of Pd and Pt.

The cerium/zirconium-base composite oxide of the present invention may be used together with a cerium/zirconium-base composite oxide produced by another method for the exhaust gas purification catalyst of the present invention.

The exhaust gas purification catalyst of the present invention is preferably in the form of structured catalyst used in an atmosphere of exhaust gases passing therethrough. The structured catalyst may be of one coated with a catalyst composition, which will be described below, another one coated with a pelletized catalyst composition, or still another one formed by a pelletized catalyst composition.

Shape of a carrier of integral structure, when used for a structured catalyst, is not limited, and may be selected from known ones, e.g., flow-through type or wall flow type which is used for DPFs.

A carrier of integral structure may be made of a metal or ceramic material. Stainless steel is a common select as a metal for the carrier. It may have a honeycomb shape or another shape having a sieving function. The useful ceramic materials include cordierite, mullite, alumina, magnesia, spinel, silicon carbide and so forth.

A carrier of integral structure may have another shape, e.g., sheet of knitted fine fibers, noncombustible felt-shape structure of relatively thick fibers or the like. A carrier of integral structure composed of a fibrous component can have a higher treating capacity than others, because it can load a larger quantity of a metallic catalyst component and a larger contact area with exhaust gases.

The flow-through or wall-flow type carrier is preferable for the present invention for various reasons, e.g., production easiness, strength as a structure, increased quantity of catalytic composition, and improved stability.

A carrier of integral structure may have an optional external shape, adequately selected from a cylinder with a circular or ellipsoidal cross-section, square column, hexagonal column and so forth suitable for an exhaust gas system in which it is positioned. Number of openings of a carrier of integral structure is adequately determined in consideration of type of exhaust gases, gas flow rate, pressure drop, purification efficiency and so forth. It is preferably about 10 to 1500/inch$^2$ for vehicle exhaust gas cleaning.

The honeycomb-shaped carrier, e.g., flow-through or wall-flow type, is structurally represented by cell density. The present invention can use a carrier having a cell density of 10 to 1500 cells/inch$^2$, preferably 300 to 900 cells/inch$^2$. A carrier having a cell density of 10 cells/inch$^2$ or more will not greatly increase pressure drop of internal combustion engine exhaust gases, and hence will not deteriorate engine performance. It can secure a sufficient contact area with exhaust gases while retaining a high structural strength, when it has a cell density of 1500 cells/inch$^2$ or less.

In this specification, a carrier of integral structure, e.g., of flow-through or wall-flow type, coated with a catalyst composition may be hereinafter referred to as a catalyst of integral structure.

The catalyst of integral structure of the present invention for exhaust gas purification can be produced by the method described above, where a slurried mixture of a metallic catalyst component or a precursor thereof, porous inorganic base described above or a precursor thereof and aqueous medium is coated on a carrier of integral structure, dried and then calcined.

More specifically, a slurry is first prepared by mixing a porous inorganic base, metallic catalyst component and aqueous medium in a prescribed ratio. It is preferable for the present invention to incorporate the metallic catalyst component at 0.01 to 25 parts by mass per 100 parts by mass of the inorganic base. The aqueous medium is used in a quantity to uniformly disperse the porous inorganic base and metallic catalyst component in the slurry. The slurry may be spread on or under another catalyst composition layer.

The slurry may be incorporated with an acid or alkali for pH adjustment, surfactant or resin for improved slurry dispersibility, or the like. The slurry can have a uniform composition when treated by a ball mill or the like for mixing/grinding, or another machine.

Then, the slurried mixture is coated on the carrier of integral structure. The method for coating the slurry is not limited, but wash coating is preferable. The slurry layer is then dried and calcined to produce the catalyst of integral structure in which the catalyst composition is loaded.

The drying temperature is preferably 100 to 300° C., more preferably 100 to 200° C. The calcinations temperature is preferably 300 to 1200° C., more preferably 400 to 800° C., particularly preferably 400 to 600° C. The heating means may be selected from known ones, e.g., electric or gas furnace.

The structured catalyst of the present invention, when used for purification vehicle exhaust gases, is preferably in the form of catalyst of integral structure, as discussed later.

As described above, the exhaust gas purification catalyst of the present invention incorporates a catalyst component powder, produced by melting a mixture of cerium and zirconium oxides and grinding the resulting composite oxide. It is clearly different from conventional OSCs, e.g., that disclosed by Patent Document 1, which are produced by calcining a mixture of cerium and zirconium salts at 1000° C. or below, or 1300° C. at the highest.

The difference of production method will account for higher purification activity for NOx or the like of the catalyst of the present invention, when exposed to a high temperature of 1000° C. or higher, because the composite oxide is not sintered at such a high temperature. By contrast, a conventional OSC is readily sintered to greatly lose is purification activity.

4. Exhaust Gas Purification Method

The exhaust gas purification method of the present invention passes exhaust gases over the exhaust gas purification catalyst of the present invention positioned in an exhaust gas passage to clean up at least one of the hazardous substances of carbon monoxide, hydrocarbons and nitrogen oxides present in the exhaust gases. It exhibits exhaust gas purification effects by the aid of the exhaust gas purification catalyst, which has a high three-way activity, in particular noted by its NOx purification performance at low oxygen content in the exhaust gases. The present invention also provides an exhaust gas purification method which reduces NOx content under rich conditions of air/fuel ratio by the aid of the exhaust gas purification catalyst containing the cerium/zirconium-base composite oxide of the present invention.

The method of the present invention is mainly intended for purification exhaust gases discharged from gasoline engines. However, it is applicable to purification exhaust gases discharged from internal combustion engines burning gasoline, diesel fuel, LPG or the like, and also from boilers, gas turbines or the like.

This method, when applied to purification vehicle exhaust gasses, positions the structured catalyst in an exhaust gas passage, the catalyst preferably in the form of integral structure.

The catalyst of integral structure is positioned in the vicinity of the exhaust, where the exhaust gases are kept at fairly high temperature, or further downstream from the underfloor type. The catalyst positioned in the vicinity of the exhaust is referred to as the one positioned directly below the engine. The catalyst positioned further downstream from the directly below type is referred to as the underfloor type, where it is exposed to exhaust gases of lower temperature. The exhaust gas purification catalyst of the present invention may be positioned either directly below the engine because it is highly resistant to high temperature, or under the floor because it can exhibit excellent OSC performance even at a relatively low temperature.

Designs of the exhaust gas purification catalyst of the present invention, containing the cerium/zirconium-base composite oxide, may be altered as required, depending on exhaust gas components or conditions, in such a way that it is mixed with another catalyst of different function(s), or used in combination with a catalyst having function(s) similar to that (those) of the present invention or completely different function(s), i.e., two-catalyst system.

Exhaust gases discharged from gasoline engines contain CO, HC and NOx as the major hazardous substances to be regulated. The present invention with the exhaust gas purification catalyst containing the composite oxide exhibits notable effects of purification these hazardous substances. Particularly noted is its capability of simultaneously purification these hazardous substances by one TWC for which the catalyst of the present invention is used. NOx purification performance under rich conditions of air/fuel ratio is one of the characteristic functions of the present invention.

The catalyst of the present invention, when used for a TWC, is preferably incorporated with rhodium as a noble metal. One of the possible mechanisms, although not fully substantiated, by which the catalyst can abate NOx emissions is accelerated steam reforming reactions. The steam reforming for NOx purification involves the following reactions:

$$HC + H_2O \rightarrow COx + H_2 \qquad (1)$$

$$H_2 + NOx \rightarrow N_2 + H_2O \qquad (2)$$

Rhodium as an active metal accelerates the steam reforming reactions, when used in combination with zirconium (refer to WO2000/027508, Page 14), and it is known that this mechanism is applicable to NOx reduction. The similar mechanism will take place also in the present invention.

It is accepted that rhodium is poisoned by CO or the like to lose activity, when exposed to exhaust gases. The composite oxide of the present invention rarely loses its activity by CO or the like, because it efficiently oxidizes and removes reductive components, e.g., CO, which cause poisoning of the rhodium surface, to accelerate its NOx purification effect.

EXAMPLES

The characteristics of the present invention are described more clearly by EXAMPLES and COMPARATIVE EXAMPLES. It is to be understood that the present invention is not limited by the embodiments described in EXAMPLES.

Oxygen release initiation temperature and oxygen release amount of the cerium/zirconium-base composite oxide produced by the present invention were determined by temperature-programmed reduction using an analyzer (MULTITASK T.P.R., BEL JAPAN INC.). More specifically, 0.3 g of the powder was heated to 700° C., at which it was held for 60 minutes in a high-purity oxygen gas atmosphere to be sufficiently oxidized. Then, it was heated from 100° to 900° C. at 10° C./minute in a flow of argon (100 sccm) containing hydrogen at 5%, to continuously measure amount of hydrogen consumed by a quadrupole mass analyzer. This produced a curve of hydrogen consumption accompanying temperature increase. Oxygen release initiation temperature and oxygen release amount were determined by the hydrogen consumption curve and its area.

Oxygen release amount at 400° C. was determined by the same procedure using the same analyzer. More specifically, 0.3 g of the powder was heated to 700° C., at which it was held for 60 minutes in a high-purity oxygen gas atmosphere to be sufficiently oxidized. Then, it was heated from 100° to 400° C. at 10° C./minute in a flow of argon (100 sccm) containing hydrogen at 5%, at which it was held for 1 hour. Amount of hydrogen consumed was measured continuously by a quadrupole mass analyzer. This produced a curve of hydrogen consumption at 400° C. Oxygen release amount at 400° C. was determined by the hydrogen consumption curve and its area.

Sccm described above as a gas flow rate unit means standard cc/minute, i.e., flow rate per minute at 25° C. and 1 atm.

Example 1

High-purity zirconium oxide (purity: 99.9%) and cerium oxide (purity: 99.9%) were used as the starting Zr and Ce materials to produce the cerium/zirconium-base composite oxide of the present invention following the method of production procedure illustrated in FIG. 1.

First, 4.2 kg of the high-purity zirconium oxide and 5.8 kg of the high-purity cerium oxide were mixed to produce 10 kg of the powder.

The mixture was molten at 2200° C. or higher for 110 minutes in an arc type electric furnace under the conditions of secondary voltage: 85 V, average load power: 99.5 kW and total work load (total electric energy): 182 kWh.

Coke (500 g) was put in the mixture to facilitate electricity distribution during the initial stage. After the melting, the molten mixture is slowly cooled in air for 24 hours in the furnace sealed with a carbon lid to produce the ingot, which was crushed by a jaw crusher and roll crusher to 3 mm or less, and then sieved to produce the powder of 1 mm or less in particle diameter.

The powder was then annealed at 800° C. for 3 hours in air in an electric furnace to remove suboxides formed and strains in the crystal formed as a result of supercooling during the melting step. It was then ground by a planetary mill for 10 minutes to produce the powder having an average particle diameter of 1.3 μm. The average particle diameter was determined by a laser diffraction/scattering analyzer (LS230, COULTER Co., LTD.).

Oxygen release initiation temperature and oxygen release amount of the resulting cerium/zirconium-base composite oxide were evaluated. The results are given in FIGS. 2 and 3 and Tables 1 and 2.

Example 2

The powder prepared in the same manner as in EXAMPLE 1 was annealed at 800° C. for 3 hours in air in an electric furnace to remove suboxides formed during the melting step and strains in the crystal formed as a result of supercooling, and then ground by a planetary mill for 30 minutes to produce the powder having an average particle diameter of 0.9 μm.

The average particle diameter was determined by a laser diffraction/scattering analyzer (LS230, COULTER Co., LTD.).

Oxygen release initiation temperature and oxygen release amount of the resulting cerium/zirconium-base composite oxide were evaluated in the same manner as in EXAMPLE 1. The results are given in FIGS. 2 and 3 and Tables 1 and 2.

Example 3

The powder prepared in the same manner as in EXAMPLE 1 was annealed at 800° C. for 3 hours in air in an electric furnace to remove suboxides formed during the melting step and strains in the crystal formed as a result of supercooling, and then ground by a planetary mill for 60 minutes to produce the powder having an average particle diameter of 0.5 μm.

The average particle diameter was determined by a laser diffraction/scattering analyzer (LS230, COULTER Co., LTD.).

Oxygen release initiation temperature and oxygen release amount of the resulting cerium/zirconium-base composite oxide were evaluated in the same manner as in EXAMPLE 1. The results are given in FIGS. 2 and 3 and Tables 1 and 2.

The cerium/zirconium-base composite oxide was subjected to a durability test carried out under heating, to follow the structural changes before and after the test by an X-ray diffractometer (XRD). FIG. 6 (A) shows the XRD patterns of the sample. The sample calcined at high 1050° C. and 1150° C. in air had the main peak (relevant to $Zr_{0.5}Ce_{0.5}O_2$) essentially overlapping each other, from which it is confirmed that the composite oxide is sufficiently stable to heat and apparently has a large crystalline structure, judging from sharpness of the peak.

Comparative Example 1

Commercial cerium nitrate (purity: 99.0%) and zirconium oxynitrate (purity: 99.0%) were each dissolved in ion-exchanged water to produce aqueous solutions containing cerium and zirconium at 20 and 25% by mass as $CeO_2$ and $ZrO_2$, respectively.

These solutions were mixed to prepare 100 g of a $CeO_2/ZrO_2$ (58/42 by mass) composite oxide. The mixture, adjusted to have a final pH level of 10.2 with 5% ammonia water, was treated to coprecipitate cerium and zirconium hydroxides.

The coprecipitate was filtered by suction filtration, washed with pure water and calcined at 1000° C. for 3 hours to produce the cerium/zirconium-base composite oxide. It was ground to have a particle diameter of 2.0 μm or less. Oxygen release initiation temperature and oxygen release amount of the resulting cerium/zirconium-base composite oxide were evaluated in the same manner as in EXAMPLE 1. The results are given in FIGS. 2 and 3 and Tables 1 and 2.

The cerium/zirconium-base composite oxide was subjected to a durability test carried out under heating, to follow the structural changes before and after the test by an X-ray diffractometer (XRD). FIG. 6 (B) shows the XRD patterns.

The sample calcined at 1050° C. and 1150° C. in air had the main peak (relevant to $Zr_{0.45}Ce_{0.65}O_2$) becoming sharper gradually, indicating that it underwent physical condition changes more notably. It is apparent, therefore, that it is clearly less stable to heat than the cerium/zirconium-base composite oxide of the present invention.

TABLE 1

| | Calcination temperature (° C.) | Oxygen release initiation temperature (° C.) | Oxygen release amount (μmol-$O_2$/g) |
|---|---|---|---|
| EXAMPLE 1 | 800 | 380 | 600 |
| EXAMPLE 2 | 800 | 372 | 550 |
| EXAMPLE 3 | 800 | 362 | 485 |
| COMPARATIVE EXAMPLE 1 | 1000 | 447 | 160 |

TABLE 2

| | Measurement temperature (° C.) | Oxygen release amount (μmol-$O_2$/g) |
|---|---|---|
| EXAMPLE 1 | 400 | 15 |
| EXAMPLE 2 | 400 | 51 |
| EXAMPLE 3 | 400 | 64 |
| COMPARATIVE EXAMPLE 1 | 400 | 6 |

Comparative Example 1

The results given in FIGS. 2 and 3 and Tables 1 and 2 indicate that the cerium/zirconium-base composite oxide, prepared in each of EXAMPLES 1 to 3, has a lower oxygen release initiation temperature than that prepared in COMPARATIVE EXAMPLE 1, 362 to 380° C. versus 447° C. It also has a higher oxygen release amount, 485 to 600 μmol-$O_2$/g versus 160 μmols-$O_2$/g. Moreover, it also has a higher oxygen release amount at 400° C., 15 to 64 μmols-$O_2$/g versus 6 μmol-$O_2$/g, by which is meant that it releases a larger amount of oxygen in a low temperature range. Therefore, it is demonstrated that the confirmed that the cerium/zirconium-base composite oxide of the present invention has a higher oxygen storage/release amount.

Example 4

The starting mixture for the cerium/zirconium-base composite oxide of the present invention was prepared in the same manner as in EXAMPLE 1 following the procedure illustrated in FIG. 1, and molten under heating in an arc type electric furnace. The molten mixture was cooled to prepare the rock-shape ingot. It was split, and the cross-section showed metallic gloss, by which it was confirmed that it was once molten.

The ingot was crushed, classified, magnetically separated, calcined in an oxidative atmosphere and finely ground to prepared the ceria/zirconia powder (cerium/zirconium-base composite oxide of the present invention) having an average particle diameter of 1.0 μm.

Then, 600 g of the composite oxide powder of the present invention was ball-milled together with 400 g of γ-alumina powder, 350 g of zirconia powder, a chloroplatinic acid solution (10 g as metal), rhodium nitrate solution (5 g as metal) and 1.5 L of an aqueous solvent for 5 hours, to prepare the mixed slurry. The resulting slurry was coated on a flow-through type structured carrier of cordierite by wash coating, dried and calcined at 500° C. for 1 hour, to prepare the catalyst of integral structure. Table 3 shows the catalyst composition, or quantities of components per unit volume of the catalyst.

Comparative Example 2

A catalyst of integral structure was prepared in the same manner as in EXAMPLE 4, except that the composite oxide was replaced by 600 g of the one prepared in COMPARATIVE EXAMPLE 1.

TABLE 3

|  | Example 4 | Comparative Example 2 |
| --- | --- | --- |
| Total quantity of coated catalytic composition | 135 g/L | 135 g/L |
| γ-alumina powder as a noble metal support | 40 g/L | 40 g/L |
| zirconia powder as a noble metal support | 35 g/L | 35 g/L |
| platinum | 1 g/L | 1 g/L |
| rhodium | 0.5 g/L | 0.5 g/L |
| Composite oxide of Example 3 | 60 g/L | — |
| Composite oxide of Comparative Example 1 | — | 60 g/L |

<Evaluation>

The catalyst of integral structure prepared in EXAMPLE 4 was positioned in an exhaust gas passage in the evaluation engine described in "Evaluation conditions" and aged under the following conditions:

[Aging Conditions]
Catalyst surface temperature: 900±5° C.
Aging mode: 3500 rpm
Aging time: 30 hours The aging-treated catalyst was evaluated for its exhaust gas purification performance under the following conditions:

The catalyst of integral structure prepared in COMPARATIVE EXAMPLE 2 was aging-treated in the same manner as for the catalyst prepared in EXAMPLE 4, and evaluated in the same manner. The evaluation conditions and results are described below:

[Catalyst Performance Evaluation 1] (Purification of HC, CO and NOx)

Each of the catalyst of integral structure prepared in EXAMPLE 4 and COMPARATIVE EXAMPLE 2 was evaluated for its catalytic performance by measuring HC, NOx and CO concentrations in exhaust gases under varying air/fuel ratios. The results are given in FIG. 4.

In FIG. 4, "λ" is excess air ratio (ratio of actual air/fuel ratio to the stoichiometric air/fuel ratio), and is sometimes referred to as standard air/fuel ratio. An air/fuel mixture of stoichiometric composition has an excess air ratio λ of 1.

An air/fuel mixture having a stoichiometrically excess air, or λ above 1, is burnt under a lean combustion condition. On the other hand, an air/fuel mixture having a stoichiometrically insufficient air, or λ below 1, is burnt under a fuel-rich condition.

The purification rate shown in FIG. 4 means a ratio of hazardous substance in treated exhaust gases to that in untreated exhaust gases.

[Catalyst of Integral Structure]
Type: Supported by a flow-through carrier
Catalyst volume: 645 cc (95 mm high and 93 mm in diameter)
Carrier material: Cordierite
Cell density: 600 cells/inch$^2$
Cell wall thickness: 4 mil

[Evaluation Conditions]
Engine used for evaluation: NA 2.4L, Gasoline engine
Measurement mode: 3000 rpm
Exhaust gas temperature: 600±2° C.
Exhaust gas analyzer: MEXA7000, HORIBA As shown in FIG. 4, the catalyst of the present invention prepared in EXAMPLE 4 abated more HC, NOx and CO concentrations than that prepared in COMPARATIVE EXAMPLE 2. Particularly noted is its excellent exhaust gas purification performance under fuel-rich conditions.

[Catalyst Performance Evaluation 2]

Each of the catalysts of integral structure prepared in EXAMPLE 4 and COMPARATIVE EXAMPLE 2 was evaluated for its catalytic performance by measuring NOx concentrations under cyclically changed air/fuel ratios. The results are given in FIG. 5. The upper curves (broken) represent cyclically changed air/fuel ratios. The lower solid curves represent NOx concentrations in exhaust gases (purification rates) changing with changed air/fuel ratios. Each of the 3 circles stresses a more noted performance difference between these catalysts.

[Catalyst of Integral Structure]
Type: Supported by a flow-through carrier
Catalyst volume: 645 cc (95 mm high and 93 mm in diameter)
Carrier material: Cordierite
Cell density: 600 cells/inch$^2$
Cell wall thickness: 4 mil

[Evaluation Conditions]
Engine used for evaluation: NA 2.4L, Gasoline engine
Air/fuel ratio changing range: 13.3 to 15.5
Exhaust gas temperature: 450±2° C.
Exhaust gas analyzer: MEXA7000, HORIBA As shown in FIG. 5, the catalyst of the present invention prepared in EXAMPLE 4 abated more NOx concentration than that prepared in COMPARATIVE EXAMPLE 2. Particularly noted is its excellent NOx purification performance under fuel-rich conditions.

It is accepted that the stoichiometric air/fuel ratio in the case of gasoline engine is 14.7. However, it operates under a fuel-rich condition, or air/fuel ratio below 14.7, when it is accelerated or driving under a heavy load. The catalyst of the present invention, prepared in EXAMPLE 4, exhibits excellent NOx purification performance under these conditions.

The ceria/zirconia-base composite oxide of the present invention exhibits effects of purification hazardous substances present in exhaust gases, when used for various exhaust gas purification catalysts and TWCs. The composite oxide of the present invention is applicable to widely varying catalytic exhaust gas purification purposes, e.g., exhaust gas oxidation catalysts, catalyzed soot filter burning/purification soot present in exhaust gases, NOx storage/purification catalysts, NOx selective reduction catalysts and so forth for internal combustion engines, when it can exhibit its oxygen storage/release amount. It is also applicable to grinding materials, electric/electronic materials and so forth, when it can exhibit its oxygen storage/release amount.

What is claimed is:

1. A cerium/zirconium-base composite oxide comprising: cerium and zirconium, the cerium/zirconium-base composite oxide being made by a step for melting the starting material mixture at a temperature of 2000° C. or greater to be molten and satisfying requirements (1) an oxygen release initiation temperature is 380° C. or below, (2) an oxygen release amount is not less than 485 μmol/g, and further (3) an oxygen release amount at 400° C. is not less than 15μmol/g, and the cerium/zirconium-base composite oxide exhibits a large crystalline structure and when calcined at a high of 1050° C. and a high of 1150° C. in air, has a main peak at both temperatures, relevant to $Zr_{0.5}Ce_{0.5}O_2$, essentially in overlap around scattering angle (2θ) 29 reaching a scattering intensity of around 100,000 for both temperatures.

2. The cerium/zirconium-base composite oxide according to claim 1, wherein the $CeO_2/ZrO_2$ molar ratio is 1/9 to 9/1.

3. The cerium/zirconium-base composite oxide according to claim 2, wherein the $CeO_2/ZrO_2$ molar ratio is 2/3 to 3/2.

4. The cerium/zirconium-based composite oxide according to claim 1, wherein an average particle diameter is 0.3 to 2.0 μm.

5. A method for producing the cerium/zirconium-base composite oxide of claim 1, comprising a step for mixing a starting material for cerium and a starting material for zirconium at a predetermined mixing ratio together; a step for melting the starting material mixture at a temperature at or above the melting point; a step for cooling the melt to form into an ingot; a step for grinding the ingot to prepare powder; then optionally removing strain within powder crystal grain under heating; and a step for grinding to further fine state.

6. The method according to claim 5 for producing the cerium/zirconium-base composite oxide, wherein the starting material mixture is heated by an arc type electric furnace.

7. The method according to claim 5 for producing the cerium/zirconium-base composite oxide, wherein the starting material mixture is heated for 0.5 to 3 hours.

8. The method according to claim 5 for producing the cerium/zirconium-base composite oxide, wherein the powder has an average particle diameter of 3 mm or less.

* * * * *